(12) United States Patent
Reedy et al.

(10) Patent No.: US 8,974,003 B2
(45) Date of Patent: Mar. 10, 2015

(54) REAR SEAT CUSHION SOUND REDUCTION MAT

(75) Inventors: Lacey A. Reedy, Brighton, MI (US); Christopher M. Vargo, Plymouth, MI (US); Paul M. Rutkowski, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 438 days.

(21) Appl. No.: 13/435,558

(22) Filed: Mar. 30, 2012

(65) Prior Publication Data

US 2013/0257133 A1 Oct. 3, 2013

(51) Int. Cl.
*A47C 7/02* (2006.01)

(52) U.S. Cl.
USPC .................. 297/452.38; 297/452.56; 296/39.3

(58) Field of Classification Search
CPC  B60R 13/08; B60R 13/0815; B60R 13/0823; G10K 11/168
USPC ............. 297/452.14, 452.55, 452.15, 452.57, 297/452.38, 217.1; 296/1.03, 39.3; 181/290
See application file for complete search history.

(56) References Cited

U.S. PATENT DOCUMENTS

| | | | |
|---|---|---|---|
| 3,452,836 A * | 7/1969 | Carsello et al. ................ | 181/144 |
| 3,713,697 A * | 1/1973 | Koepke ..................... | 297/452.61 |
| 3,833,259 A * | 9/1974 | Pershing .................... | 297/452.27 |
| 3,861,747 A * | 1/1975 | Diamond .................. | 297/452.49 |
| 4,060,280 A * | 11/1977 | Van Loo ................... | 297/452.61 |
| 4,099,278 A * | 7/1978 | Parisi ................................. | 5/400 |
| 4,191,798 A * | 3/1980 | Schumacher et al. .......... | 428/95 |
| 4,242,395 A * | 12/1980 | Zuckerman et al. ............ | 428/96 |
| 4,379,190 A * | 4/1983 | Schenck ......................... | 428/95 |
| 4,403,007 A * | 9/1983 | Coughlin ........................ | 428/95 |
| 4,456,705 A | 6/1984 | McCarthy | |
| 4,516,656 A * | 5/1985 | Fleshler ........................ | 181/175 |
| 4,529,639 A * | 7/1985 | Peoples et al. .................. | 428/95 |
| 4,568,124 A * | 2/1986 | Kanai ....................... | 297/440.22 |
| 4,579,764 A | 4/1986 | Peoples, Jr. et al. | |
| 4,819,288 A * | 4/1989 | Lowthian .......................... | 5/653 |
| 5,509,712 A | 4/1996 | Rausch et al. | |
| 5,542,747 A * | 8/1996 | Burchi ...................... | 297/452.55 |
| 5,700,052 A * | 12/1997 | Yamazaki et al. ......... | 297/217.3 |
| 5,762,842 A * | 6/1998 | Burchi et al. ................ | 264/46.4 |
| 5,882,073 A * | 3/1999 | Burchi et al. ................ | 297/218.2 |
| 5,954,403 A * | 9/1999 | Mock et al. ............... | 297/452.18 |
| 5,989,699 A * | 11/1999 | Kuczynski et al. ......... | 428/316.6 |
| 6,175,980 B1 * | 1/2001 | Gaither ............................ | 5/654 |
| 6,224,150 B1 * | 5/2001 | Eksin et al. ................ | 297/180.1 |
| 6,409,269 B1 * | 6/2002 | Aebischer et al. ........ | 297/452.55 |
| 6,457,777 B1 * | 10/2002 | Kazuno et al. ........... | 297/452.48 |
| 6,631,785 B2 * | 10/2003 | Khambete et al. ............ | 181/290 |
| 6,652,034 B1 * | 11/2003 | Schramm et al. ........ | 297/452.35 |

(Continued)

*Primary Examiner* — Philip Gabler
(74) *Attorney, Agent, or Firm* — Dinsmore & Shohl LLP

(57) ABSTRACT

A sound blocking rear seat assembly for an automotive vehicle. The rear seat assembly includes a seat back adjacent to a seat bottom. The seat bottom also defines at least two passenger seating locations. A seat base of the seat bottom extends the width of the seat assembly and has a non-planar three dimensional contoured upper surface. A nonporous resilient sound blocking layer has a shape substantially conforming to the upper surface of the seat base and is located over the seat base such that it extends substantially continuously and uninterruptedly over the width of the seat assembly. Positioned over the sound blocking layer is a resilient seat cushion, and a trim layer is located over the seat cushion layer.

20 Claims, 2 Drawing Sheets

(56) References Cited

U.S. PATENT DOCUMENTS

| | | | |
|---|---|---|---|
| 6,669,265 B2 * | 12/2003 | Tilton et al. | 296/146.1 |
| 6,739,673 B2 | 5/2004 | Gupta et al. | |
| 6,905,650 B2 * | 6/2005 | McIntosh et al. | 264/554 |
| 6,955,845 B1 * | 10/2005 | Poole et al. | 428/76 |
| 6,983,822 B2 * | 1/2006 | O'Regan et al. | 181/290 |
| 7,159,938 B1 * | 1/2007 | Shiraishi | 297/217.4 |
| 7,213,876 B2 * | 5/2007 | Stoewe | 297/180.14 |
| 7,229,132 B2 * | 6/2007 | Meeker et al. | 297/250.1 |
| 7,585,030 B2 * | 9/2009 | Galbreath et al. | 297/452.27 |
| 7,591,346 B2 * | 9/2009 | Thompson et al. | 181/291 |
| 7,677,660 B2 * | 3/2010 | Galbreath et al. | 297/217.1 |
| 7,802,843 B2 * | 9/2010 | Andersson et al. | 297/180.14 |
| 7,905,552 B2 * | 3/2011 | Galbreath et al. | 297/452.27 |
| 7,918,308 B2 * | 4/2011 | Cohen | 181/150 |
| 7,971,683 B2 * | 7/2011 | Bayle et al. | 181/286 |
| 8,360,517 B2 * | 1/2013 | Lazanja et al. | 297/180.14 |
| 8,540,318 B2 * | 9/2013 | Folkert et al. | 297/452.53 |
| 8,657,383 B2 * | 2/2014 | Galbreath et al. | 297/452.27 |
| 8,696,067 B2 * | 4/2014 | Galbreath et al. | 297/452.1 |
| 2004/0021350 A1 * | 2/2004 | House | 297/217.4 |
| 2004/0155512 A1 | 8/2004 | Nakamura | |
| 2005/0104423 A1 * | 5/2005 | Yu | 297/214 |
| 2005/0110327 A1 * | 5/2005 | Chernoff et al. | 297/452.14 |
| 2005/0168046 A1 * | 8/2005 | Hadi et al. | 297/463.2 |
| 2005/0189811 A1 * | 9/2005 | Herrmann et al. | 297/452.65 |
| 2005/0263345 A1 * | 12/2005 | Erickson et al. | 181/290 |
| 2006/0061190 A1 | 3/2006 | Fukuda et al. | |
| 2006/0065481 A1 * | 3/2006 | Connelly | 181/290 |
| 2007/0236071 A1 * | 10/2007 | Fujita et al. | 297/452.5 |
| 2008/0296946 A1 * | 12/2008 | Reynolds et al. | 297/284.6 |
| 2009/0066127 A1 * | 3/2009 | Galbreath et al. | 297/217.1 |
| 2009/0091166 A1 * | 4/2009 | Jha | 297/250.1 |
| 2010/0171346 A1 | 7/2010 | Laframboise | |
| 2011/0018329 A1 * | 1/2011 | Galbreath et al. | 297/452.18 |
| 2011/0221254 A1 * | 9/2011 | Lindsay et al. | 297/452.18 |
| 2012/0248839 A1 * | 10/2012 | Fujita et al. | 297/311 |
| 2013/0341120 A1 * | 12/2013 | Koo et al. | 181/290 |
| 2014/0159445 A1 * | 6/2014 | Sam et al. | 297/214 |

\* cited by examiner

REAR SEAT CUSHION SOUND REDUCTION MAT

BACKGROUND

1. Field of the Invention

The present invention generally relates to automotive seating. More specifically, the invention relates to a construction for the rear seat of an automotive vehicle.

2. Description of Related Art

One perception of a higher end automotive vehicle is the low level of noise occurring in the passenger compartment of the vehicle as the vehicle is being driven along a roadway. The noise generated from the rear floor panels of a vehicle contribute to the overall noise levels within the interior cabin of the vehicle. The panels themselves vibrate in a range of frequencies that produce noise, which has the negative side effect on the perception of the quietness of the vehicle.

Various means have been devised to insulate the passenger compartment from noise or to dampen the noise being transmitted into the passenger compartment. For example, the metal surfaces of automotive floor panels, door panels and roof panels have been coated with compositions of fillers dispersed in binders so as to provide the desired level sound deadening. In other examples, sheet materials have previously been heated, softened and applied so as to conform to the surfaces to similarly provide the desired sound deadening capabilities. In addition to coating or covering the metal surfaces of structural components of the vehicle, another method of providing for the deadening sound within the automotive vehicle is formation of an acoustically insulating carpet assembly that incorporating features and materials that enhance the attenuation properties of the carpet. However, incorporating such carpeting over the entire interior of the vehicle, and specifically in locations where carpeting is not visible, is a poor implementation of such systems in that it is expensive and undesirable.

SUMMARY

With the present invention, a mechanism has been developed to block a significant portion of the noise intruding upon the interior cabin of the vehicle through the floor panels, and thereby improve the noise comfort of the interior cabin. The present invention provides a seat assembly that is suitable for use in an automotive vehicle and which has deliberate sound-deadening characteristics such that the transmission of sound, particularly roadway noise, into the passenger compartment of the vehicle through the floor of the vehicle is reduced by the seat. This reduction is tunable within the construction of the seat itself.

The seat assembly, according to one aspect of the present invention, includes a seat back assembly that is located adjacent to and extends generally upward from a seat bottom assembly. The seat bottom assembly is configured to be mounted to the floor pan of the vehicle and has a width that extends laterally relative to the longitudinal axis of the vehicle. Preferably, the seat bottom assembly defines at least two passenger seating locations and has a construction that includes several distinct layers. One such layer is a seat base. The seat base has a non-planar, 3-dimensional contour upper surface. Located over the seat base is a sound-blocking layer. The sound-blocking layer is a non-porous resilient layer that extends substantially, continuously over the seat base, including the seating locations. Additionally, the sound-blocking layer has a shape that substantially conforms to the shape of the upper surface of the seat base. Located over the top of the sound-blocking layer, is a resilient seat cushion, and provided over the seat cushion is a trim layer.

In another aspect of the invention, the sound-blocking layer is in surface-to-surface contact with the upper surface of the seat base.

In an additional aspect of the invention, the sound-blocking layer is freely resting on the upper surface of the seat base.

In still another aspect of the invention, the seat base defines a base thickness, the seat cushion defines a cushion thickness and the sound-blocking layer defines a blocking layer thickness, wherein the thickness of the blocking layer is less than the thickness of the seat base and less than the thickness of the seat cushion.

In another aspect of the invention, the sound-blocking layer is completely covered by the seat cushion and in direct contact therewith.

In a further aspect of the invention, the sound-blocking layer extends uninterruptedly across substantially the entire width of the rear seat assembly.

In another aspect of the invention, the sound-blocking layer is formed of ethylene vinyl acetate.

In a further object of the invention, seat base is formed of expanded polypropylene.

In still another aspect of the invention, the seat cushion is a resilient foam cushion.

Further objects, features and advantages of this invention will become readily apparent to persons skilled in the art after a review of the following description, with reference to the drawings in the claims that are appended to and form a part of this application.

DETAILED DESCRIPTION

Figure 1:
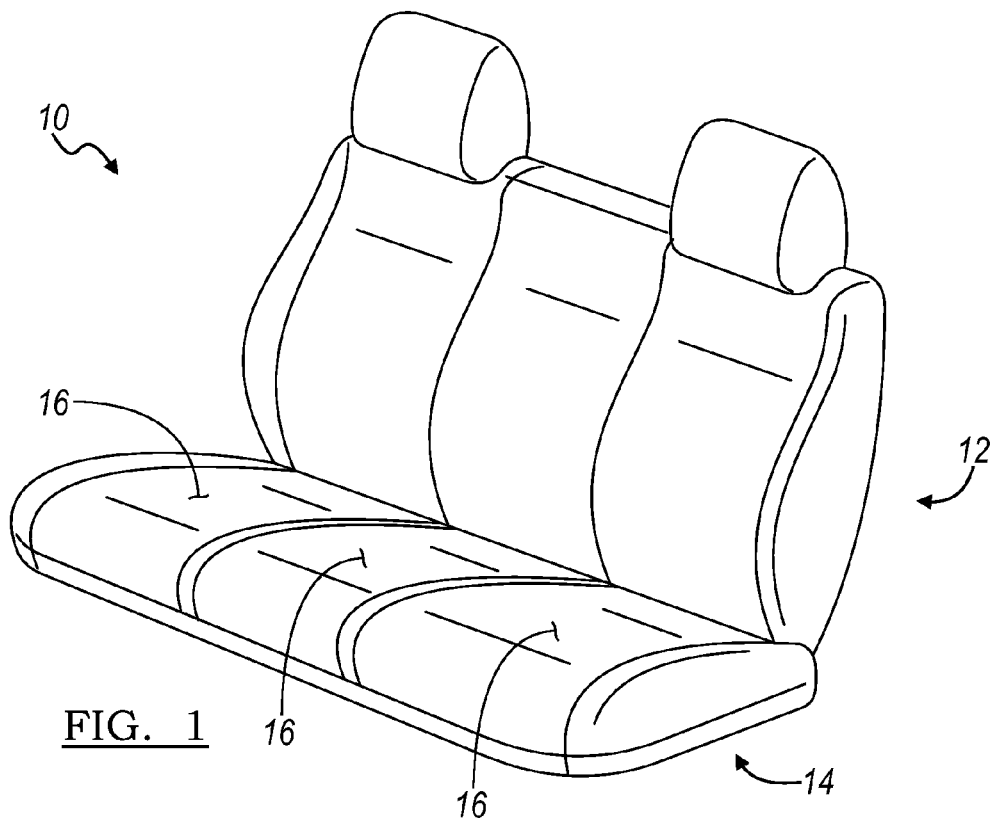
FIG. 1 is a perspective view of a rear seat assembly incorporating the principles of the present invention.

As used herein, directional terms are to be understood relative to an automotive vehicle and its direction of travel. The forward direction is therefore towards the front of the vehicle; the rearward direction is toward the rear of vehicle; the lateral directions are toward the sides of the vehicle; the upward direction is toward the roof of the vehicle; and the downward direction is toward the bottom of the vehicle Referring now to the drawings, a rear seat assembly embodying the principles of the present invention is illustrated therein and generally designated at 10. As its primary components, the rear seat assembly 10 includes two subassemblies, namely a seat back 12 and a seat bottom 14. The seat back 12 is located adjacent to a rearward end of the seat cushion 14 and extends generally upwardly therefrom. Collectively, the seat back 12 and the seat cushion 14 cooperate to define a number of seating locations, generally designated at 16, for passengers of the automotive vehicle. The rear seat assembly 10 seen in FIG. 1 defines three such seating locations 16.

In the vehicle, sound is transmitted into the passenger compartment through various structural components. One such structural component is the floor of the vehicle. In the rear passenger compartment of an automotive vehicle, the rear seat assembly 10 often rests directly on a floor pan 18. Since the floor pan 18 is covered by the seat bottom 14, in this area the floor pan 18 is not and need not be covered with carpeting. Carpeting in such an instance is an added, and therefore unwanted, expense.

During operation of a vehicle, vibration and/or road noise (sound) tends to be transmitted into the rear passenger compartment area through the floor. One measure that is taken in an attempt to attenuate this sound is the provision of a damp mat 20 on the floor pan 18. However, while the damp mat does operate to attenuate some sound, in more luxury-branded vehicles, this sound attenuation may not be sufficient.

With the present invention, a higher level of sound attenuation or blocking is achieved and, therefore, the invention will have application in luxury-branded vehicles, but could be employed in any vehicle.

Figure 2:
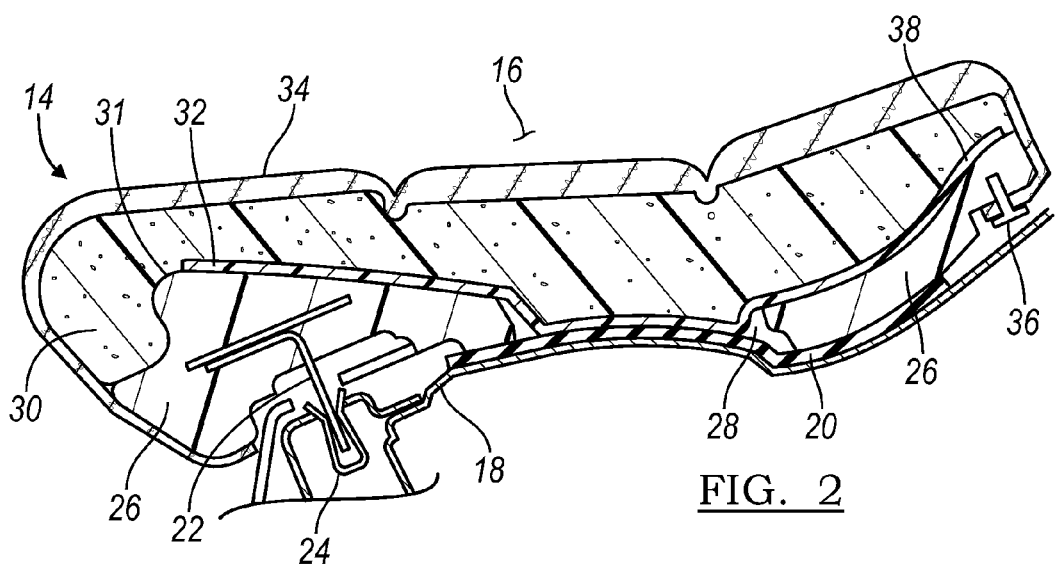
FIG. 2 is a cross-sectional view through a portion of the seat bottom of the rear seat assembly seen in FIG. 1.

Seen in FIG. 2 is a seat bottom 14 embodying the principles of the present invention. The seat bottom 14 is mounted to the floor pan 18 of the vehicle through engagement of a mounting hook 22, formed as part of the seat bottom 14, with a mounting catch 24 in the floor pan 18. In essence, the mounting hook 22 is received within the mounting catch 24 and retained therein by well-known means. This engagement between the mounting hook 22 and the mounting catch 24 retains the seat bottom 14 in position on the floor pan 18. The mounting hook 22, itself, is part of a seat base 26 of the seat bottom 14 and may be formed of a metal rod or stamping.

Figure 3:
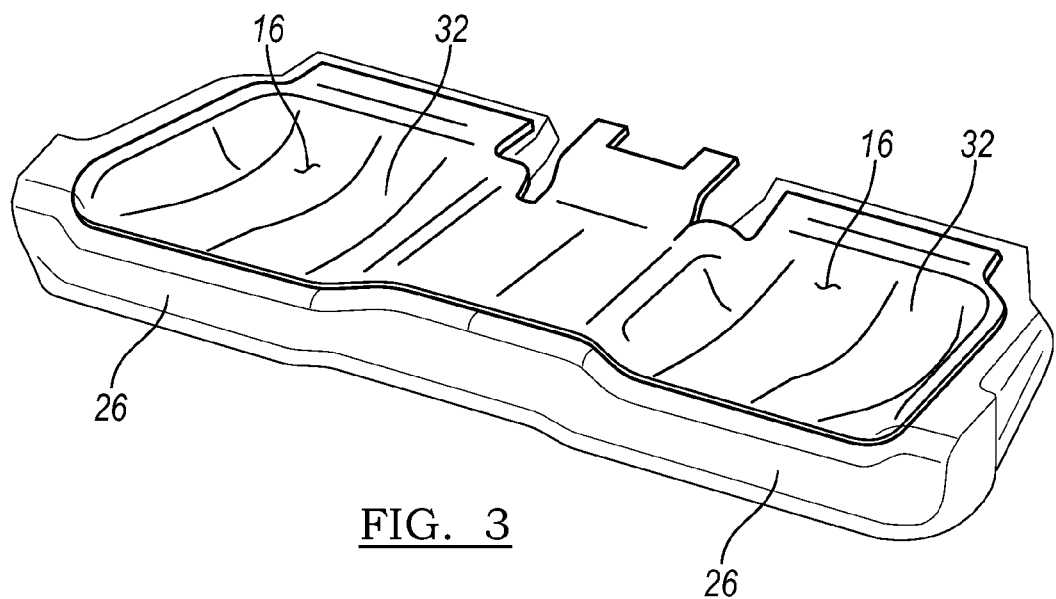
FIG. 3 is a perspective view of the sound-blocking layer in surface-to-surface engagement with the seat base.

The seat base 26 extends the width of the rear seat assembly 20 (as seen in FIG. 3) and may be provided in a variety of constructions. The seat base 26 may have a traditional metal frame and spring construction. Alternatively, the seat base 26 may be formed with a 3-dimensional contoured upper surface 31 from which the remaining portions of the seat bottom 14 are built up. In an effort to reduce weight in automotive vehicles, the seat base 26 illustrated in the figures is not formed of a metal construction. Rather, the seat base 26 is formed as a molded, non-metal material that not only provides the support for the seat bottom 14, but which also provides the internal suspension or a spring rate for the seat bottom 14. One preferred material for such a seat base 26 is expanded polypropylene (EPP).

While the seat base 26 extends the full width of the rear seat assembly 10, in the illustrated embodiment, a recess 28 is provided within the area of at least two of these seating locations 16, preferably the seating locations on the right and left sides of the rear seat assembly 10. The recesses 28 serve several functions. One function is to facilitate registration or positioning of layers provided on top of the seat base 26. Another function is to provide a centralized area having enhanced cushioning, by virtue of the omission of the seat base 28 in this area, for the comfort of the passenger sitting thereon. To provide for this comfort, the seat bottom 14 includes a seat cushion 30 positioned on top of the seat base 26 and over the recess 28. The seat cushion 30 is typically a urethane foam material and, as seen in FIG. 2, as an increased thickness generally in the area of the recessed 28. The increased thickness provides added padding for the comfort of the seat's occupant. When utilizing a traditional construction for the seat base, the seat cushion 30 may be molded such that the frame is substantially encapsulated by the foam.

Figure 4:
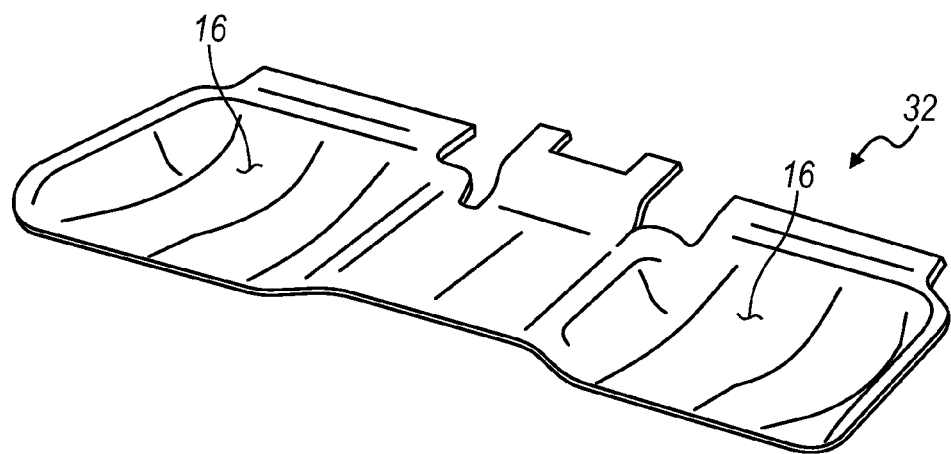
FIG. 4 is a perspective view of the sound-blocking layer isolated from the seat base.

According to the present invention, located between the seat cushion 30 and the seat base 26 is a sound-blocking layer 32. As seen in the figures, the sound-blocking layer is configured in its free condition so as to exhibit a shape that substantially conforms to the upper surface of the seat base 26 over which it is to be installed. The sound-blocking layer installed on the upper surface 31 of the seat base 26 is seen in FIG. 3. As seen in FIG. 4, the sound-blocking layer 32 is shown isolated from the remaining portions of the seat bottom. Notably, the sound-blocking layer 32 extends substantially uninterruptedly across the entire width of the rear seat assembly 10 and, therefore, the seat base 26. The sound-blocking layer 32 also extends over and bridges the recesses 28 formed in the seat base 26 at the left and right primary seating locations 16. In these seating locations, the location of the recesses 28, the sound-blocking layer 32 contacts a lower surface of the seat cushion 30 located thereabove, and may contact either the damp mat 20 (if provided) or the floor pan 18, the latter situation occurring when no damp mat 20 is utilized in the vehicle. In a traditional construction, the sound-blocking layer 32 may be encased within the cushion 30 as a result of the molding of the cushion 30 about the seat base 26 or the sound-blocking layer 32 may be secured in surface-to-surface contact with an exterior surface of the cushion 30, such as the underside/bottom surface of the cushion 30.

Preferably, the sound-blocking layer 32 is formed of a material that is non-porous. One such preferred material is ethylene vinyl acetate (EVA). EVA is a rubber-like material and is available in a variety of thicknesses. Being available in various thicknesses, the employment of EVA sheets of different masses can be used to tune the spring rate of the seat base 26 and can therefore be used to improve transmission loss performance of the seat bottom 14 (attenuate the vibrations/sound being transmitted into the passenger compartment from the floor beneath the seat bottom 14) at specific frequencies or range of frequencies, such as 125-630 Hz. For example, in one implementation of the present invention, the sound transmission loss of the seat bottom 26 was increased by over 1 dB through the incorporation of a 1 mm EVA sound-blocking layer 32 having a mass of 1.5 kg into the seat bottom 26. In another example, the sound transmission loss was increased by about 2 dB through the incorporation of a 2 mm EVA sound-blocking layer 32 having a mass of 2 kg into a seat bottom 26, as compared to a similarly constructed seat bottom 26 without wither a 1 mm or 2 mm EVA sound-blocking layer 32. It is anticipated that thicknesses for the sound-blocking layer will range from 0.5 to 10 mm depending upon the particular aspects of the application and design into which the invention is being incorporated. Accordingly, the effectiveness of the increase in sound transmission loss is perceived as being between 0.1-2.0 dB.

The sound-blocking layer 32 also preferably exhibits a depth, as measured from the front edge of the seat bottom 14 to the general location of the seat back 12 that is less than the depth of either the seat base 26 or the seat cushion 30. In this way, the sound-blocking layer 32 can be registered with both the seat base 26 and the seat cushion 30, by formation of a corresponding recess 38 in the lower surface of the seat cushion 30. This further prevents the sound-blocking layer 32 from interfering with the fit of the seat cushion 30 on the seat base 26 and finish of a trim layer 34, such as a leather material, over the seat cushion 30 and about the seat base 26 wherein it is secured by fasteners 36 and the like.

We claim:

1. A sound blocking rear seat assembly for an automotive vehicle, the rear seat assembly comprising:

a seat back located adjacent to and extending generally upward from a seat bottom, the seat bottom defining a width extending laterally relative to a longitudinal axis of the vehicle and further defining at least two seating locations for passengers in the vehicle, the seat bottom further including a seat base extending substantially the width of the seat bottom and beneath each of the seating locations, a sound-blocking layer incorporated into the seat bottom, the sound blocking layer being a nonporous resilient layer extending substantially continuously over the width of the seat bottom, a resilient seat cushion also incorporated into the seat bottom, and a trim layer located over the seat cushion layer, wherein the sound-blocking layer provides a decrease in sound transmission of between about 0.1-2 dB as compared to a seat bottom of the same construction without the sound-blocking layer.

2. The rear seat assembly of claim 1, wherein the seat base has a non-planar three dimensional contoured upper surface and the sound-blocking layer is in contact with the upper surface and has a shape substantially conforming to the upper surface of the seat base.

3. The rear seat assembly of claim 1, wherein the sound-blocking layer is freely resting on the upper surface of the seat base.

4. The rear seat assembly of claim 1, wherein the sound-blocking layer is in surface-to-surface contact with an upper surface of the seat base.

5. The rear seat assembly of claim 1, wherein the seat base defines a base thickness, the seat cushion defines a cushion thickness and the sound-blocking layer defines blocking layer thickness, the thickness of the sound-blocking layer being less than the thickness of the seat base and being less than the thickness of the seat cushion.

6. The rear seat assembly of claim 1, wherein the sound-blocking layer is in registry with the seat cushion.

7. The rear seat assembly of claim 1, wherein the sound-blocking layer extends uninterruptedly over the width of the rear seat assembly.

8. The rear seat assembly of claim 1, wherein the sound-blocking layer has a thickness in the range of 0.5 to 10 mm.

9. The rear seat assembly of claim 1, wherein the sound blocking-layer is formed of ethylene vinyl acetate.

10. The rear seat assembly of claim 9, wherein the seat base is formed of expanded polypropylene.

11. The rear seat assembly of claim 9, wherein the seat cushion is a foam cushion.

12. The rear seat assembly of claim 1, wherein the sound-blocking layer is located between the seat base and the seat cushion.

13. A sound blocking assembly for an automotive vehicle, the sound blocking assembly comprising:
an automotive interior component defining a width extending laterally relative to a longitudinal axis of the vehicle, the interior component further including a base layer material extending substantially the width of the interior component, the base layer material having a non-planar three dimensional contoured surface, a sound-blocking layer attached the base layer material, the sound blocking layer being a nonporous resilient layer extending substantially continuously over the base layer material, wherein the sound-blocking layer provides a decrease in sound transmission of between about 0.1-2 dB as compared to an interior component of the same construction without the sound-blocking layer.

14. The sound-blocking assembly of claim 13, wherein the sound-blocking layer is in surface to surface contact with a surface of the base layer material.

15. The sound-blocking assembly of claim 14, wherein sound-blocking layer has a shape substantially conforming to the lower surface of the base layer material.

16. The sound-blocking assembly of claim 14, wherein sound-blocking layer has a shape substantially conforming to the upper surface of the base layer material.

17. The sound-blocking assembly of claim 13, wherein the base layer material defines a base thickness and the sound-blocking layer defines blocking layer thickness, the blocking layer thickness being less than the base thickness.

18. The sound-blocking assembly of claim 13, wherein the sound-blocking layer extends uninterruptedly over the width of the interior component.

19. The sound-blocking assembly of claim 13, wherein the sound-blocking layer is formed of ethylene vinyl.

20. The sound-blocking assembly of claim 13, wherein the sound-blocking layer is formed of ethylene vinyl acetate and has a thickness in the range of 0.5 to 10 mm.

* * * * *